(12) United States Patent
Miyamoto

(10) Patent No.: US 11,568,102 B2
(45) Date of Patent: Jan. 31, 2023

(54) SYSTEMS AND METHODS FOR OPTIMIZING BATTERY DESIGNS IN MULTIPLE DIMENSIONS

(71) Applicant: Toyota Motor Engineering & Manufacturing North America, Inc., Plano, TX (US)

(72) Inventor: Kaito Miyamoto, East Amherst, NY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 410 days.

(21) Appl. No.: 16/698,286

(22) Filed: Nov. 27, 2019

(65) Prior Publication Data
US 2021/0157959 A1    May 27, 2021

(51) Int. Cl.
*G06F 30/20*      (2020.01)
*H01M 10/0525*    (2010.01)
(Continued)

(52) U.S. Cl.
CPC ........ *G06F 30/20* (2020.01); *H01M 10/0436* (2013.01); *H01M 10/0525* (2013.01); *G06F 30/27* (2020.01); *G06F 2111/10* (2020.01)

(58) Field of Classification Search
CPC ................ G06F 30/20; G06F 2111/10; H01M 10/0436; H01M 10/0525
See application file for complete search history.

(56) References Cited

U.S. PATENT DOCUMENTS

| 9,559,349 B2 | 1/2017 | Braun et al. |
| 10,038,214 B2 | 7/2018 | Rust, III et al. |

(Continued)

FOREIGN PATENT DOCUMENTS

| WO | WO-2009024355 A1 * | 2/2009 | ............ G01R 27/02 |
| WO | 2010007579 A1 | 1/2010 | |

(Continued)

OTHER PUBLICATIONS

Dong Yeon Yoo Simulation Based Design of Lithium Ion Battery Configuration Using Bayesian Optimization Georgia Institute of Technology, Aug. 2018 (Year: 2018).*

(Continued)

*Primary Examiner* — Rehana Perveen
*Assistant Examiner* — Cuong V Luu
(74) *Attorney, Agent, or Firm* — Christopher G. Darrow; Darrow Mustafa PC

(57) ABSTRACT

System, methods, and other embodiments described herein relate to determining an improved electrode design of a battery. In one embodiment, a method includes computing one or more equivalent circuits as porous electrode transmission line models corresponding to one or more electrode designs. Individual circuits of the equivalent circuits define an arrangement of electrode elements having at least two geometric degrees of freedom. The electrode designs are defined according to battery specifications indicating at least a battery volume, and a separator thickness. The method includes determining attributes for the equivalent circuits according to the at least the two geometric degrees of freedom in which the equivalent circuits are defined. The method includes identifying a target design of the electrode designs associated with one of or more of the attributes satisfying a circuit threshold. The target design improves one or more of the attributes in relation to the battery.

18 Claims, 5 Drawing Sheets

(51) Int. Cl.
*H01M 10/04* (2006.01)
*G06F 111/10* (2020.01)
*G06F 30/27* (2020.01)

(56) References Cited

U.S. PATENT DOCUMENTS

| | | | |
|---|---|---|---|
| 2003/0099884 | A1 | 5/2003 | Chiang et al. |
| 2012/0052375 | A1 | 3/2012 | Johnson et al. |
| 2016/0126558 | A1 | 5/2016 | Lewis et al. |
| 2018/0241035 | A1 | 8/2018 | Hur et al. |

FOREIGN PATENT DOCUMENTS

| | | | | |
|---|---|---|---|---|
| WO | WO-2016151336 A1 * | 9/2016 | ........... | G01R 31/367 |
| WO | 20190160810 A1 | 8/2019 | | |

OTHER PUBLICATIONS

Malifarge et al. Determination of Tortuosity Using Impedance Spectra Analysis of Symmetric Cell Journal of The Electrochemical Society, 164 (11) E3329-E3334, 2017 (Year: 2017).*

Delacourt et al., "Measurements and Simulations of Electrochemical Impedance Spectroscopy of a Three-Electrode Coin Cell Design for Li-Ion Cell Testing," (Journal of The Electrochemical Society, 161 (9), 2014).

Scipioni et al., "A Physically-Based Equivalent Circuit Model of the Impedance of a LiFePO4/Graphite 26650 Cylindrical Cell," (Journal of The Electrochemical Society, 164 (9), 2017).

Kim et al., "Metamodel-Based Optimization of a Lithium-Ion Battery Cell for Maximization of Energy Density with Evolutionary Algorithm," Journal of The Electrochemical Society, 166 (2), A211-A216 (2019).

Ogihara et al., "Impedance Spectroscopy Characterization of Porous Electrodes Under Different Electrode Thickness Using a Symmetric Cell for High-Performance Lithium-Ion Batteries," Journal of Physical Chemistry, 119, 4612-4619 (2015).

Ender et al., "Analysis of Three-electrode Setups for AC-Impedance Measurements on Lithium-Ion Cells by FEM Simulations," Journal of The Electrochemical Society, 159 (2), A128-A136 (2012).

Ogihara et al.,"Theoretical and Experimental Analysis of Porous Electrodes for Lithium-Ion Batteries by Electrochemical Impedance Spectroscopy Using a Symmetric Cell," Journal of The Electrochemical Society, 159 (7), A1034-A1039 (2012).

Itagaki et al., "Impedance Analysis on Electric Double Layer Capacitor with Transmission Line Model," Journal of Power Sources, 164, 415-424 (2007).

Ning et al., "Holographic Patterning of High-Performance on-Chip 3D Lithium-Ion Microbatteries," Proceedings of the National Academy of Sciences of the United States of America, 112 (21), (2015) (in 6 pages).

Hahn et al., "Development of Micro Batteries Based on Micro Fluidic MEMS Packaging," Symposium of Design, Test, Integration & Packaging of MEMS and MOEMS (2017) (in 5 pages).

Arthur et al., "Three-Dimensional Electrodes and Battery Architectures," Materials Research Society, vol. 36, (2011) (in 9 pages).

Roberts et al. ,"3D Lithium Ion Batteries—From Fundamentals to Fabrication," Journal of Materials Chemistry, vol. 21 (27), (2011) (in 16 pages).

Long et al., "Three-Dimensional Battery Architectures," Chem. Rev., vol. 104, 4463-4492 (2004) (in 30 pages).

Sun et al., "3D Printing of Interdigitated Li-Ion Microbattery Architectures", Adv. Mater. 25, 4539-4543 (2013) (in 5 pages).

Hur, et al., "High Areal Energy Density 3D Lithium-Ion Microbatteries", found at: https://doi.org/10.1016/j.ioule.2018.04.002 (2018) (in 16 pages).

Chapter 6. Capacitors and RC Circuits, pp. 119-138, 20 pages.

* cited by examiner

SYSTEMS AND METHODS FOR OPTIMIZING BATTERY DESIGNS IN MULTIPLE DIMENSIONS

TECHNICAL FIELD

The subject matter described herein relates, in general, to systems and methods for optimizing battery designs, and, in particular, to an improved approach for representing battery designs in multiple dimensions involving the use of a porous electrode model that functions in multiple geometric degrees of freedom.

BACKGROUND

In the age of the Internet of Things (IoT), in which things and people are connected via the internet, there is a growing need for improving the power source for such devices. Some of the key properties for the power source are power, energy density, and lifetime (or cyclability), and a promising candidate, the micro lithium-ion battery, is attracting attention in the world. However, in general, the micro-battery has a problem with a small amount of battery capacity and, therefore, low energy density since it is difficult to load enough active materials in a small space. Thus, there is a need to look beyond the overall packaging constraints and focus attention on designing the battery at the micro-scale level for achieving advancements in power, energy density, and cyclability. Yet, many approaches to performing such optimizations are constrained by different techniques that do not permit, for example, analysis in a greater number of dimensions or, more generally, in a more robust manner as may be needed to overcome the noted difficulties.

SUMMARY

Systems, methods, and other embodiments associated with a manner of improving a battery design through the use of equivalent circuits, which describe the reactions in multi-dimensionally designed porous electrodes, are disclosed herein. Such equivalent circuits may be referred to herein as multi-dimensional porous electrode transmission line models or porous transmission line models with multiple degrees of freedom. In one embodiment, a battery modeling system for determining an improved electrode design of a battery is disclosed. The battery modeling system includes one or more processors and a memory communicably coupled to the one or more processors. The memory stores a modeling module including instructions that when executed by the one or more processors cause the one or more processors to compute one or more equivalent circuits as porous electrode transmission line models corresponding to one or more electrode designs. Individual circuits of the equivalent circuits define an arrangement of electrode elements having at least two geometric degrees of freedom. The electrode designs are defined according to battery specifications indicating at least a battery volume and a separator thickness. The memory stores an analysis module including instructions that when executed by the one or more processors cause the one or more processors to i) determine attributes for the equivalent circuits according to the at least the two geometric degrees of freedom in which the equivalent circuits are defined, and ii) identify a target design of the electrode designs associated with one or more of the attributes satisfying a circuit threshold. The target design improves one or more of the attributes in relation to the battery when implementing the battery according to the target design.

In one embodiment, a non-transitory computer-readable medium for determining an improved electrode design of a battery and including instructions that when executed by one or more processors cause the one or more processors to perform one or more functions. The instructions include instructions to compute an equivalent circuit as a porous electrode transmission line model corresponding to an electrode design. The equivalent circuit defines an arrangement of electrode elements having at least two geometric degrees of freedom. The electrode design is defined according to a battery specification indicating at least a battery volume, and a separator thickness. The instructions include instructions to determine attributes for the equivalent circuit according to the at least the two geometric degrees of freedom in which the equivalent circuits are defined. The instructions include instructions to provide the attributes as an electronic output about the electrode design.

In one embodiment, a method for determining an improved electrode design of a battery is disclosed. The method includes computing one or more equivalent circuits as porous electrode transmission line models corresponding to one or more electrode designs. Individual circuits of the equivalent circuits define an arrangement of electrode elements having at least two geometric degrees of freedom. The electrode designs are defined according to battery specifications indicating at least a battery volume and a separator thickness. The method includes determining attributes for the equivalent circuits according to the at least the two geometric degrees of freedom in which the equivalent circuits are defined. The method includes identifying a target design of the electrode designs associated with one of or more of the attributes satisfying a circuit threshold, wherein the target design improves one or more of the attributes in relation to the battery when implementing the battery according to the target design.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
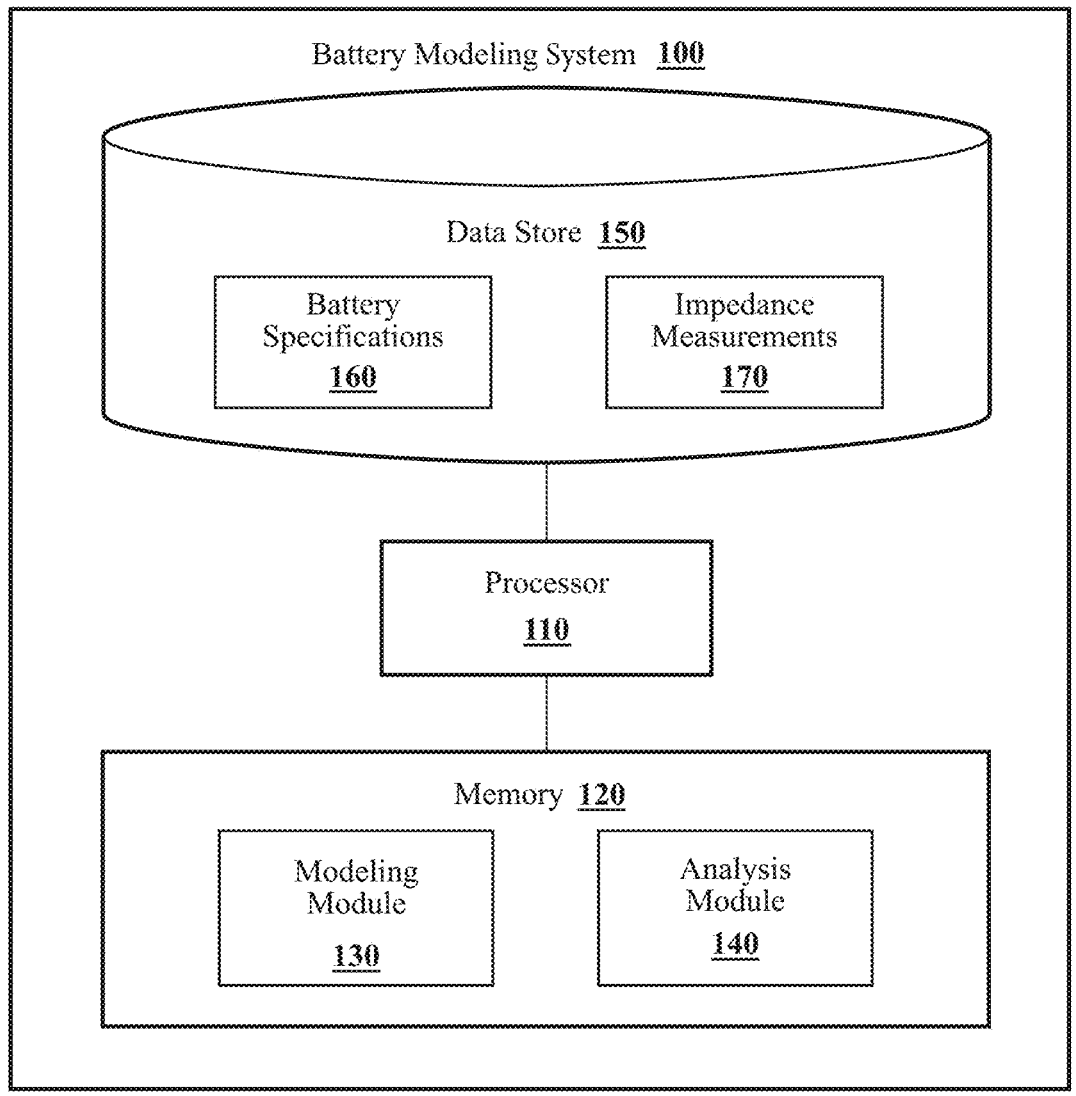
FIG. 1 illustrates one embodiment of a battery modeling system that is associated with analyzing electrode designs using porous transmission line models with multiple degrees of freedom.

Systems, methods, and other embodiments associated with a manner of improving a battery design through the use of multi-dimensional porous electrode transmission line models are disclosed. As mentioned previously, various advances in technology induce pressures to adapt batteries that can further facilitate technological advances. Thus, in the case of IoT devices and other mobile or small form factor electronics, there is a general pressure to reduce battery size while maintaining both power and energy density. That is, even though the devices may be small, these devices still require a battery to provide a certain level of power to support functionality and/or reduce a need to change or recharge such batteries. However, as previously noted, many approaches to optimizing designs for such batteries are generally limited in that the various techniques do not extend to considering multiple dimensions/degrees of freedom for electrode designs and further also do not consider complex geometries.

Therefore, in the embodiments disclosed herein, the disclosed aspects improve the design and analysis of electrodes for batteries. For example, in one aspect, a disclosed system functions to optimize electrode geometries. That is, the disclosed system implements a novel approach to automating electrode designs in order to provide a broad sampling of possible geometries. By way of example, the disclosed system may function by defining general battery specifications for designing a battery including aspects such as separator thickness, element resolution, battery volume, and so on. In further aspects, the battery specification may include a finer granularity of information about the battery, such as materials for separate elements, properties of the materials, symmetric cell impedance measurements, and so on. In any event, the system uses this information as a basic outline of how to generate electrode designs for the battery.

Thus, the system then, in one approach, prepares a vacant battery cell and divides space within the battery cell according to the defined resolution. The defined resolution generally controls a size of electrode elements that the system places into the battery cell. Thus, in one approach, the system uses cuboids to represent the electrode elements (e.g., portions of an overall electrode) that are geometrically defined by the resolution in relation to a size (i.e., height, width, length) of the battery overall. In further aspects, the system may define the electrode elements according to different geometries other than cuboids (e.g., interlocking polyhedrons, etc.). In any case, the system fills the battery cell using the elements in a defined manner to produce, for example, one or many different iterations of the electrode designs.

The manner in which the system fills the battery cell with the electrode elements involves arranging/locating the electrode elements for positive and negative electrodes within the cell according to a set of rules. For example, the rules generally define acceptable geometries for placing the electrode elements that avoid isolating opposing types of electrode elements (e.g., surrounding/isolating a positive electrode with negative electrodes or vice versa) and placement of negative electrodes next to a current collector of positive electrode side, etc. Accordingly, while the system may strive to generate new electrode designs having different geometries through randomizing the placement of the elements, the system supervises this process to ensure the noted difficulties do not occur by identifying acceptable locations for placement of elements during a random sampling process of the battery cell.

One example protocol for performing the random sampling according to the noted rules/constraints may be as follows: i) determine the proportion of positive and negative electrode elements, ii) place/locate the positive electrode elements along the current collector for the positive electrode side, iii) place remaining positive electrode elements randomly in available locations with consideration to the noted rules, and iv) responsive to all of the positive electrode elements being placed, fill vacant spaces with negative electrodes to complete electrode design. This process may be iterated to generate further designs, and, in one or more embodiments, the system may perform the process by beginning with the placement of the negative electrode elements instead of the positive electrode elements.

In any case, once one or more electrode designs are available, the system can proceed with the analysis of the electrode designs to determine various attributes such as internal resistance, impedance, and other aspects. Accordingly, because the battery design generally uses porous electrodes for both positive and negative electrodes, the system generates equivalent circuits for the designs that describe electrochemical reactions in the porous electrodes. This approach provides, for example, a mechanism for evaluating aspects of the design such as internal resistance ($R_{inter}$) of the lithium-ion battery.

In particular, in at least one implementation, the system adapts and extends a transmission line model to handle multi-dimensional geometric changes of the porous electrodes. Thus, the system divides an electrode design into circuit elements in multiple dimensions, thereby providing multiple degrees of freedom in the analysis instead of being restrained to a single dimension (e.g., only thickness of the electrodes and the separator in a parallel-plate configuration). This permits the system to analyze complex electrode geometries as created by the random sampling approach. For example, the system generates the equivalent circuits according to the multi-dimensional porous electrode transmission line model by initially dividing the electrodes in the cell into sub-elements. The divisions may mirror the resolution involved in originally producing a design or may use elements of a finer resolution (e.g., smaller cuboids) to provide improved fidelity. In any case, the system divides the design into a plurality of elements (e.g., 30×150) that have equal sizes and shapes.

The system then connects the elements to define at least ion and electron resistances, thereby representing the connections as separate resistors according to the defined geometric degrees of freedom for the model (e.g., two or more). After connecting the resistances, separate corresponding series models/circuits are connected interfacially according to impedances (represented as blocks in the illustrations provided herein). The separate elements (resistors, etc.) represent separate paths within the electrodes and, thus, the separate reactions between the porous electrodes. As additional aspects of the noted multi-dimensional porous electrode transmission line model, the electron resistances in the current collectors can be further represented to, for example, stabilize determinations about various attributes (e.g., stabilize impedance calculations). Thus, by generating the multi-dimensional porous electrode transmission line models having two or more geometric degrees of freedom, the system can better assess attributes of complex electrode designs to generate and determine improved batteries having, for example, improved internal resistances that relate to higher power and energy densities.

Referring to FIG. 1, one embodiment of a battery modeling system 100 that is implemented to perform methods and other functions as disclosed herein relating to generating, analyzing, and identifying improved electrode designs for a battery is illustrated. As an initial matter, it should be appreciated, that while the battery modeling system 100 is illustrated as being a single discrete system, in various embodiments, the battery modeling system 100 is a distributed system that is comprised of components that can be distributed across multiple servers, provided by a cloud-based service, and so on.

With further reference to FIG. 1, the battery modeling system 100 is shown as including a processor 110. Accordingly, the processor 110 may represent a distributed processing resource, an individual local processor (e.g., a CPU, GPU, or application-specific processor), or the battery modeling system 100 may access the processor 110 through a data bus or another communication path. In one embodiment, the battery modeling system 100 includes a memory 120 that stores a modeling module 130 and an analysis module 140. The memory 120 is a random-access memory (RAM), read-only memory (ROM), a hard-disk drive, a flash memory, a processor cache, or other suitable memory for storing the modules 130 and 140. The modules 130 and 140 are, for example, computer-readable instructions that when executed by the processor 110 cause the processor 110 to perform the various functions disclosed herein. Thus, as may be appreciated, in various implementations, the modules 130 and 140, as envisioned herein, may be integrated as a component of the processor 110, stored in an associated/accessible memory to the processor 110, implemented as a standalone electronic functional unit, and so on.

Moreover, as previously noted, in various embodiments, one or more aspects of the battery modeling system 100 are implemented as cloud-based services, and so on. Thus, one or more components of the battery modeling system 100 may be located remotely from other components and may be implemented in a distributed manner. As an additional matter, the battery modeling system 100 includes a data store 150 as a means of storing various data elements. In one embodiment, the data store 150 is implemented as a database or other electronic data structure stored in a memory (e.g., memory 120) and that is configured with, for example, routines that can be executed by the processor 110 for analyzing stored data, providing stored data, organizing stored data, and so on. Thus, in one embodiment, the data store 150 stores data used by the modules 130 and 140 in executing various functions. In the embodiment, as depicted in FIG. 1, the data store 150 includes one or more battery specifications 160, impedance measurements 170, electrode designs, networks describing equivalent circuits, electronic outputs of circuit attributes (e.g., internal resistances, impedances, capacitances, etc.), and/or other information such as may be used by the modules 130 and/or 140.

With further reference to the battery modeling system 100, in one embodiment, the modeling module 130 includes instructions that function to control the processor 110 to generate one or more electrode designs, and compute equivalent circuits (also referred to herein as multi-dimensional porous electrode transmission line models). It should be appreciated that while the modeling module 130 is discussed as both generating the designs and computing the equivalent circuits, in further embodiments, the modeling module 130 acquires the designs as an electronic input from a separate system (e.g., a cloud-based system) that is distinct from the battery modeling system 100. As an additional note prior to proceeding with the discussion of the modeling module 130, the modules 130 and 140 will be discussed in combination with examples depicted in FIGS. 2-4. It should be appreciated, that the noted examples are provided for purposes of explanation, and, thus, while the noted examples are generally illustrative of the processes may omit various aspects for purposes of the brevity of this discussion. Therefore, the FIGS. 2-4 should not be construed as comprehensive but simply as illustrative examples.

Figure 2:
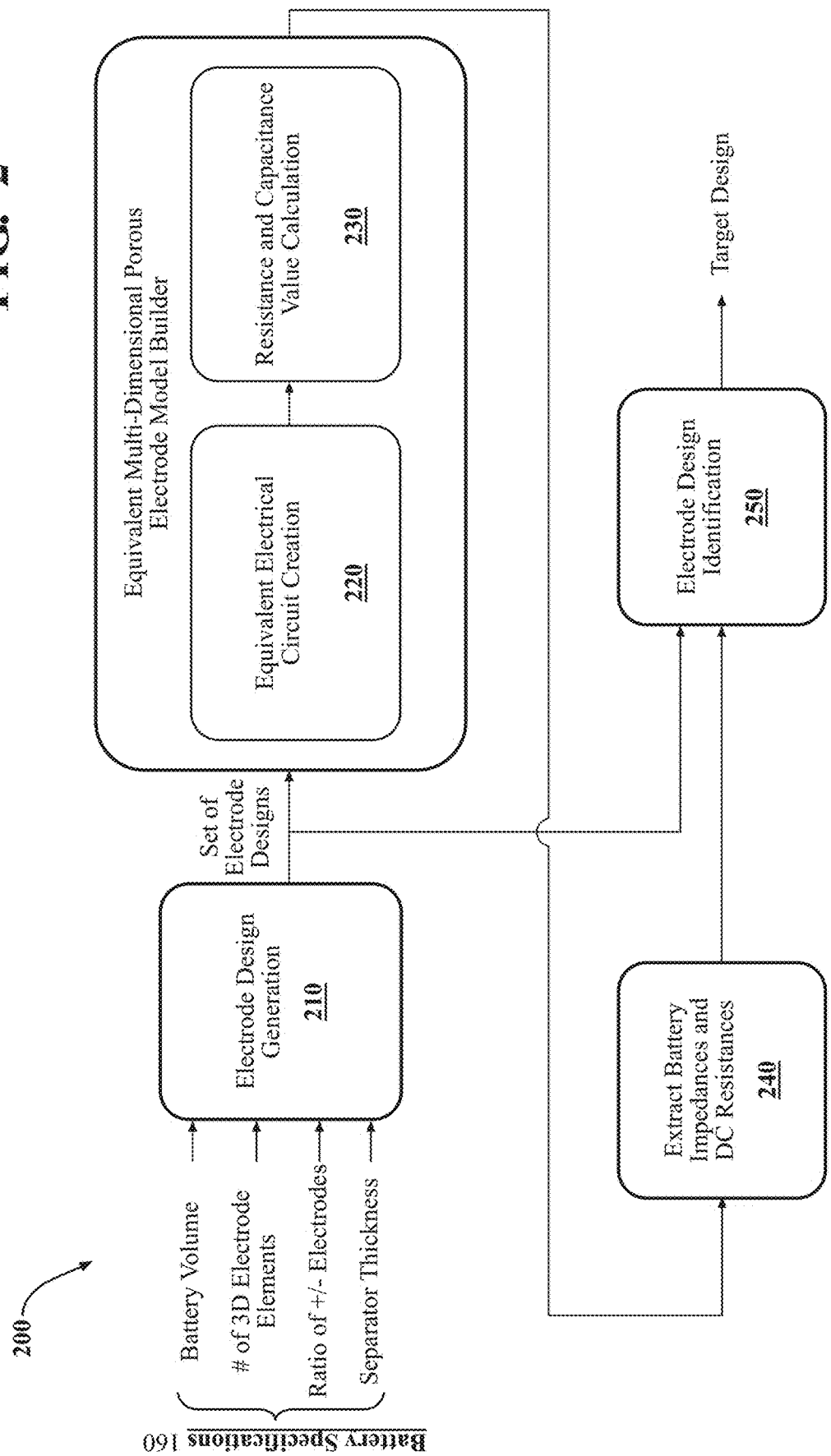
FIG. 2 illustrates one example of a process flow for generating an electrode design and analyzing the electrode design.

In any case, for at least one embodiment, the modeling module 130 generates one or more electrode designs. Accordingly, briefly consider FIG. 2, which illustrates one example of a process flow 200 associated with the modeling system 100. As shown in FIG. 2, at block 210, the modeling module 130 receives various electronic inputs in the form of the battery specifications 160. In one embodiment, the battery specifications 160 define various characteristics of the battery that is being designed. For example, as illustrated, the battery specifications 160 include a battery volume, a number of electrode elements (i.e., a resolution/size of elements for constructing the electrodes), a ratio of positive electrode elements to negative electrode elements, and a separator thickness. In further aspects, the battery specifications 160 may include additional or fewer components. For example, in one embodiment, the battery specifications 160 may define the impedance measurements 170 for a given battery volume, identifications of material types for different aspects of the battery (e.g., aluminum collector, copper collector, etc.), and so on. In further aspects, the modeling module 130 may also receive electronic inputs indicating controls for adapting the generation of the electrode designs including a number of designs to produce, a random seed for randomizing the placement of the elements, and other constraints that may adapt the electrode design generation.

Thus, the modeling module 130, responsive to the battery specifications 160 or another electronic control signal, generates a set of electrode designs. As an example set of the battery specifications 160, consider the following: the resolution is generally defined between 30 μm to 100 μm, which is a resolution of 60 μm×60 μm for the instant example, with the battery having dimensions of 600 μm×3000 μm×3000 μm, divided into 10×50×1 elements, a ratio of 1:1, and a separator thickness of 0.02 mm. Each of the electrode designs generally defines a layout of aspects of the battery. For example, a given design defines a geometry of a positive electrode, a negative electrode, respective current collectors, and a separator between the two electrodes in at least two dimensions (i.e., height and width) while a third dimension (i.e., thickness) may be specified or otherwise held as a constant value.

Figure 3A:
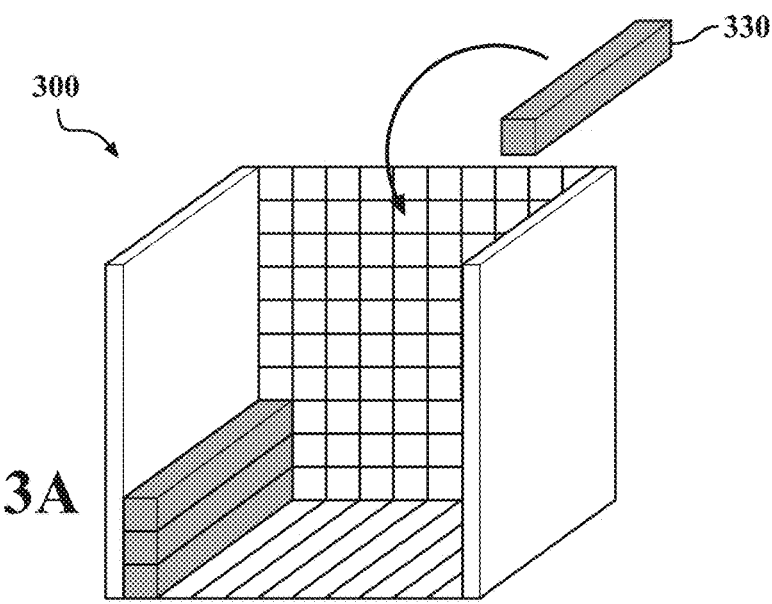
FIGS. 3A-C illustrate an example process for constructing an electrode design for a battery.
Figure 3B:
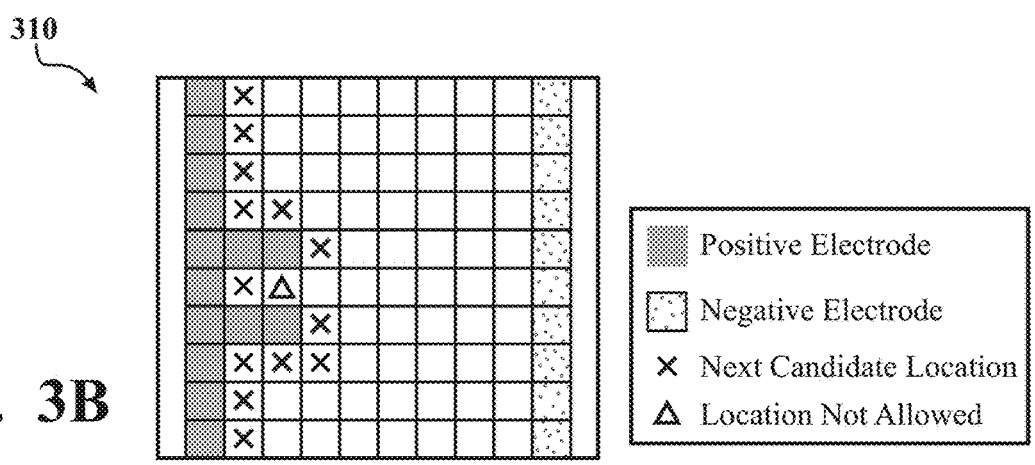
Figure 3C:
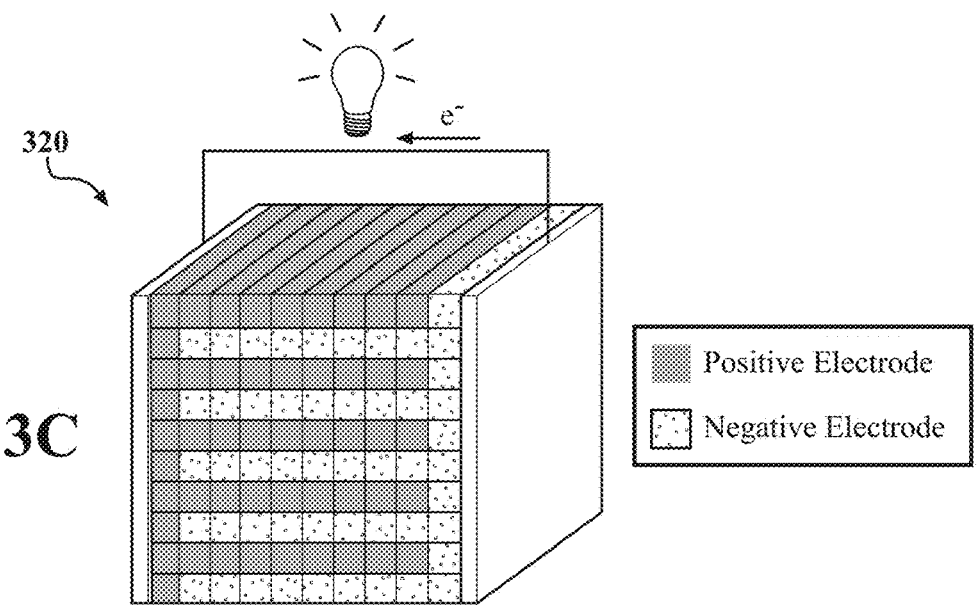

In any case, as yet a further explanation of generating electrode designs, FIGS. 3A, 3B, and 3C illustrate one example of how the modeling module 130 generates a design. FIG. 3A illustrates a partially vacant battery cell 300, FIG. 3B illustrates a two-dimensional cross-section 310 of the cell 300 at a subsequent point in time, and FIG. 3C illustrates a complete electrode design 320. Accordingly, as shown in cell 300, the modeling module 130 is populating the cell 300 with positive electrodes 330 of a particular size/resolution. That is, the defined resolution from the battery specification 160 generally controls a size of electrode elements that the modeling module 130 places into the battery cell 300. The size of the electrode elements may correspond to a resolution of a manufacturing process for the battery (e.g., minimum pitch for an inkjet printing process, 3D printing process, etc.). Thus, the modeling module 130, in one approach, divides the space between the collectors into equal-sized shapes (e.g., cuboids, or another defined geometric form) that are defined by the resolution in relation to a size (i.e., height, width, length).

The modeling module 130 can then place electrode elements in the cell according to a defined set of constraints/rules. In one embodiment, as shown in FIG. 3A, the modeling module 130 begins by placing positive electrode elements along the current collector for the positive electrode side. This ensures that negative electrode elements do not contact the positive side collector. In other words, as a general constraint, the modeling module 130 arranges positive electrode elements such that the positive electrode elements do not touch a negative current collector, and vice versa. Thus, once positioned in this way, the modeling module 130 continues with placing electrode elements via a random sampling of remaining vacancies. As shown in FIG. 3B, the partially filled cell 310, further illustrates constraints for a subsequently placed positive electrode element. That is, the modeling module 130 identifies locations that are acceptable for a candidate electrode, and also locations that are not permitted. The cell 320 illustrates labeled examples of permissible locations and one location that is not permissible as an example.

Of course, the remaining vacant locations in the labeled cell 320 are also impermissible, but have not be labeled as such. In any case, the location that is explicitly labeled as not allowed indicates a placement location that could result in a circumstance of isolating a negative electrode with positive electrodes surrounding on all adjacent sides. This generally undesirable for a configuration of the electrode elements, and is therefore constrained. In any case, among the available permissible locations, the modeling module 130 iteratively places positive electrodes while continuing to determine subsequently constrained locations according to developing geometries until the available set of positive electrode elements is exhausted. Thereafter, the modeling module 130 fills vacant spaces with negative electrode elements to complete the electrode design. This process may be repeated to generate further designs, and, in one or more embodiments, the system may perform the process by beginning with the placement of the negative electrode elements instead of the positive electrode elements. Moreover, the modeling module 130 may generate the design for a portion of the vacant cells (e.g., an upper third), and then repeat the portion to provide a repeating pattern.

Thus, the process implemented by the modeling module 130 to generate the electrode designs can be generally summarized as arranging electrode elements adjacently to ensure continuity between electrode elements of a same type, and avoiding arrangements of electrodes that isolate electrode elements of an opposing type (e.g., surrounding vacant location with electrodes of a single type that may then result in placement of an opposing type of electrode in the isolated location). In one approach, the modeling module 130 implements a search algorithm to enforce placement of the electrode elements. The search algorithm may take various forms. As one example, the search algorithm may be a breadth-first search of the vacant locations that checks connectivity to identify when placement would result in isolation of a location.

Continuing with FIGS. 1 and 2, the modeling module 130 further includes instructions to compute equivalent circuits as porous electrode transmission line models corresponding to the electrode designs. Thus, as shown at block 220 of the flow 200 of FIG. 2, the modeling module 130 uses the previously acquired electrode design(s) and generates equivalent circuits in order to further analyze attributes of the designs. The equivalent circuits function to represent the configuration of the electrodes using discrete circuit elements connected via an ordered set of nodes. That is, the modeling module 130 represents the configuration of electrodes and associated electrochemical behaviors through a process of modeling divided sections of the elements using discrete sets of circuit elements and nodes. In particular, the modeling module 130 undertakes a process to define an arrangement of electrode elements having at least two geometric degrees of freedom in relation to the configuration of circuit nodes and circuit elements.

Figure 4A:
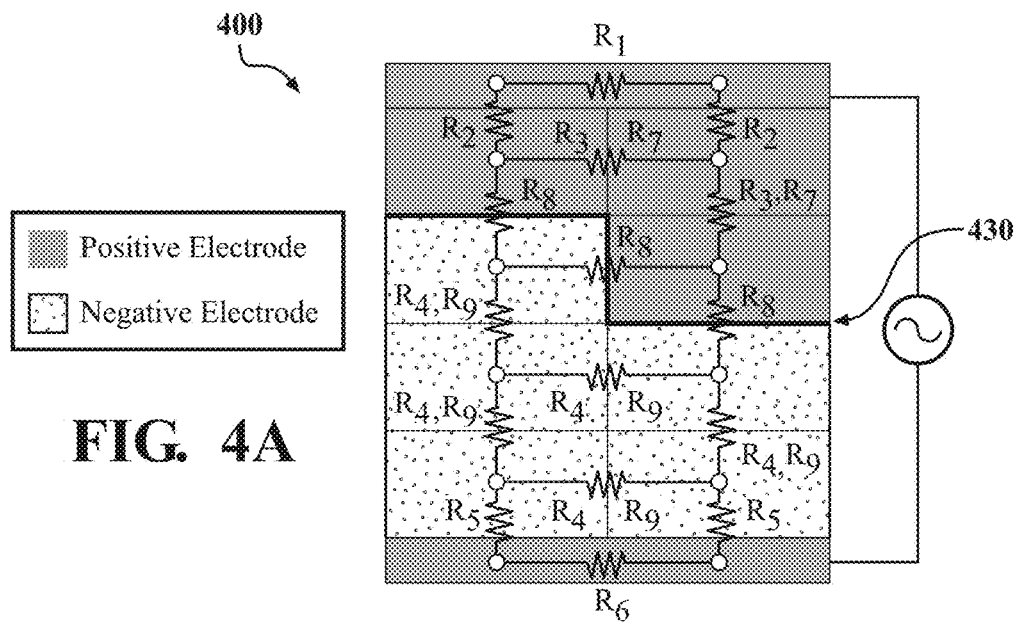
FIGS. 4A-C illustrates one example of analyzing an electrode design within a battery to generate a multi-dimensional porous transmission line model representing the battery.
Figure 4B:
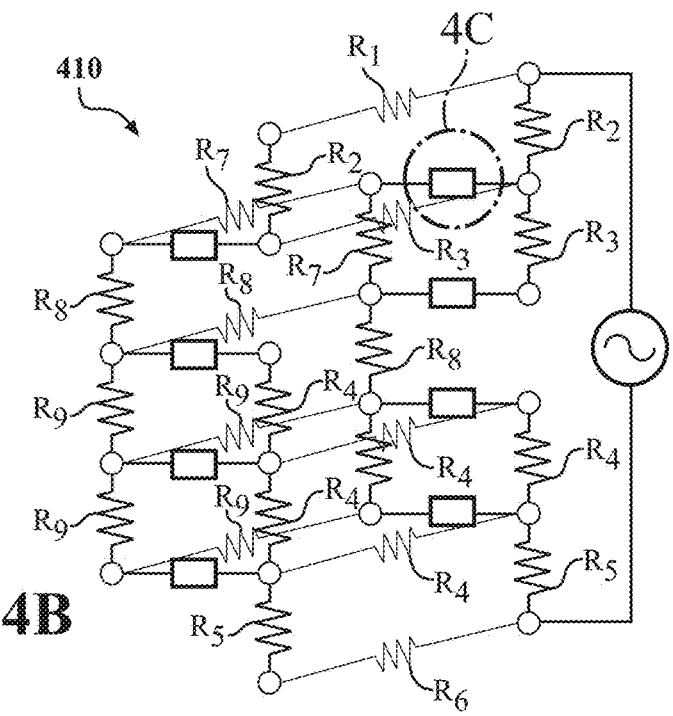
Figure 4C:
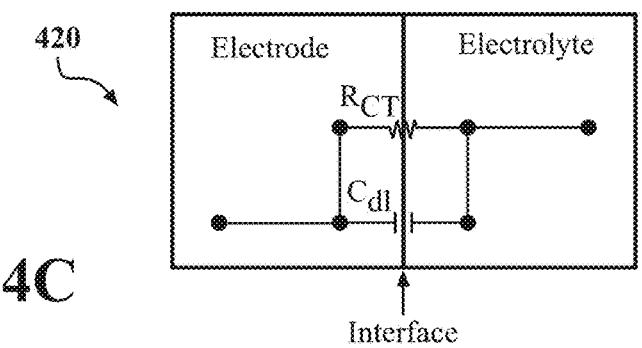

As a further example of how the modeling module 130 computes the equivalent circuits to represent behaviors of the electrode designs, reference will be made to FIGS. 4A-4C. FIG. 4A illustrates a two-dimensional representation 400 of an electrode design with an overlay of representative corresponding circuit elements and nodes. Thus, as shown, the modeling module 130 has divided the design into electrode elements according to a resolution that defines a number of electrode elements for an equivalent circuit. As a general principle of how the modeling module 130 divides the electrode design, the divisions may equal the resolution associated with originally producing the design, which defines characteristics of the electrodes and a size of a division that is needed to accurately represent the characteristics. Moreover, the modeling module 130 may further extend the resolution to provide a finer granularity in the equivalent circuit (i.e., more divisions than used in the design). Thus, the particular approach that is undertaken may depend on the implantation and a desired accuracy of the resulting analysis. In any case, the modeling module 130, in the example of FIG. 4A, divides the design into a 4×2 representation, as shown by the separate nodes overlaid onto the design. Additionally, the separator 430 is shown between positive and negative electrodes.

It should be noted that the 4×2 division is provided for purposes of simplicity in this discussion, and, in practice, the modeling module 130 may divide the electrode design into a plurality of elements in varying combinations depending on the characteristics of the design and the implementation. For example, the modeling module 130 may divide a design into 10×50×1, 30×150×1, or another division of elements. In further aspects, the modeling module 130 may divide the design into additional geometric design degrees of freedom such as 10×50×2, 30×150×3, and so on. Whatever the resolution of the divisions, the modeling module 130 generates the shapes of the divisions in an equal manner such that the electrode elements do not leave gaps in the divided electrodes and fully represent the electrode design.

Once divided, the modeling module 130 defines nodes according to centers of each electrode element and connects the nodes across the divisions according to separate resistances embodied by electrochemical processes acting therein. Thus, for connections between nodes within the same electrode, the modeling module 130 generates resistances representing ionic resistance and electron resistance. Thus, within the same electrode the resistances are generally represented as two separate aspects. Across the separator between the different electrodes the separate interfaces may be represented by a single resistance, the ionic resistance. As shown in FIGS. 4A and 4B, the modeling module 130 represents the resistances across the separator as ionic resistances shown as R8. The modeling module 130 represents resistances within a same electrode across divisions as R3/R7, and R4/R9. These combinations of resistances within the same electrode are extrapolated into parallel circuits in three-dimensions when represented as the equivalent circuit, which are then connected by interfacial impedances shown as the block elements in FIG. 4B. As an additional aspect, the modeling module represents the collector plates using resistances R1 and R6, respectively, while representing connections to the electrode elements as R2 and R5. In one respect, the electron resistances in the current collectors are considered for stability in determining the various attributes of the battery cell. In one embodiment, the separate resistances R1-R6 represent electron resistances, while resistances R7-R9 represent Ion resistances embodied as separate parallel circuits connected via the impedances.

Accordingly, once the modeling module 130 defines the separate resistances across the divisions as shown in FIG. 4A, the modeling module 130 then generates the three-dimensional representation of the equivalent circuit by connecting separate series circuits defined by the pairs of resistances using the interfacial impedances. FIG. 4C illustrates one example of such an impedance which is shown as an interface between an electrode and electrolyte that is modeled using a resistance $R_{CT}$ and a capacitance $C_{dl}$, which will be discussed in greater detail subsequently The resulting 3D porous electrode model represents the electrode design in at least two degrees of freedom depending on the divisions undertaken by the modeling module 130 initially when generating the equivalent circuit. In this way, the modeling module 130 represents electrochemical aspects of complex geometries such as the stuttered electrode design with the zigzag separator shown in FIG. 4A, which under other techniques would not be possible. Thus, the modeling module 130 implements the noted process, in one regard, as an extension of the transmission line model (TLM), which describe electrochemical behaviors for cylindrical pores of electrodes within individual designs of the electrode designs.

Additionally, as noted in FIG. 2 at block 230, the circuit elements of the equivalent circuits include element attributes comprising electron resistances, ionic resistances, charge-transfer resistances, and electric double-layer capacitances. Thus, in one embodiment, the modeling module 130 computes the noted attributes as part of generating the equivalent circuit. However, in further aspects, the analysis module 140 may compute the attributes as a precursor to determining additional attributes such as the internal resistance an identifying a target design.

Turning to the analysis module 140, in one embodiment, the analysis module 140 includes instructions that function to control the processor 110 to i) determine the attributes for the equivalent circuits according to the at least the two geometric degrees of freedom in which the equivalent circuits are defined, and ii) identify a target design of the electrode designs associated with one of or more of the attributes satisfying a circuit threshold. It should be appreciated that the attributes identified by the analysis module 140 are leveraged to determine a specific one or more of the designs as the target design that, in one embodiment, improves one or more of the attributes in relation to the battery when implementing the battery according to the target design. In other words, the circuit threshold generally indicates optimal aspects of a design according to which the module 140 can select the target design. The target design may then identify one of the designs that has matching attributes, which are preferred for a particular implementation.

Accordingly, at blocks 230 and 240, the analysis module 140 determines the attributes of the equivalent circuits. In one embodiment, the analysis module 140 calculates values of the electron resistances and the ionic resistances according to a volume of the electrode elements and the separator thickness. Moreover, the analysis module 140 further calculates, in one embodiment, values of the charge-transfer resistances $R_{CT}$, and the electric double-layer capacitances $C_{dl}$ according to the battery volume, the separator thickness, and impedance measurements of a symmetric cell representation of the battery.

From this information, the analysis module 140 may further determine additional attributes of the equivalent circuits such as impedances and an internal resistance. For example, the analysis module 140, in one embodiment, extracts an equivalent internal resistance by removing electric double-layer capacitances of the equivalent circuit, and collapsing the equivalent circuit to the equivalent resistance through a process of combining series elements of the equivalent circuit and parallel elements of the equivalent circuit until the equivalent resistance remains. As an additional explanation of how the battery modeling system 100 determines the attributes, consider the following discussion relating to the internal resistance and the correspondence between the internal resistance and the power and the energy density of the battery.

In regards to the noted resistances and capacitances identified previously, consider the following:

$$R[\Omega] = \rho[\Omega \text{ cm}] \times \frac{L[\text{cm}]}{A[\text{cm}^2]} \quad (1)$$

Where $\rho$ is the electrical resistivity, and where L and A are the length and cross-sectional area of the resistance, respectively. The electric double-layer capacitance of the interface between the electrolyte and the electrode is defined by:

$$C_{dl}[F] = \epsilon_{dl}[F/\text{cm}] \times \frac{A_{reac}[\text{cm}^2]}{d_{dl}[\text{cm}]} \quad (2)$$

Where $\delta_{dl}$ and $d_{dl}$ are the permittivity and the thickness of the electric double layer, respectively, and where $A_{reac}$ is the electrode surface area. Electron resistances $R_e$ are defined as the resistance between positive electrodes ($R_e^{pos}$), negative electrodes ($R_e^{neg}$), current collectors ($R_e^{ccp}$ for the positive side, and $R_e^{ccn}$ for the negative side), and between the electrode and current collector ($R_e^{pos/cc}$ and $R_e^{pos/cc}$). The resistance that connects the identical/same electrode elements are defined by:

$$R_e^{pos} = \rho_e^{pos} \times \frac{l}{a} \quad (3)$$

$$R_e^{neg} = \rho_e^{neg} \times \frac{l}{a} \quad (4)$$

Where $\rho_e^{pos}$ and $\rho_e^{neg}$ are the electron resistivities of the positive and negative electrodes, respectively, and where l and a are the distance and cross-sectional area of the connecting two elements, respectively. The resistance between the current collectors are computed using the following:

$$R_e^{ccp} = \rho_e^{ccp} \times \frac{l}{a} \quad (5)$$

$$R_e^{ccn} = \rho_e^{ccn} \times \frac{l}{a} \quad (6)$$

Where $\rho_e^{ccp}$ and $\rho_e^{ccn}$ are the electron resistivities of the current collectors of the positive and negative electrodes, respectively. The resistance between the electrode and the current collector is defined by:

$$R_e^{pos/cc} = \rho_e^{pos} \times \frac{l/2}{a} + \rho_e^{ccp} \times \frac{l_c}{a} \quad (7)$$

$$R_e^{neg/cc} = \rho_e^{neg} \times \frac{l/2}{a} + \rho_e^{ccn} \times \frac{l_c}{a} \quad (8)$$

Where $l_c$ is the distance between the current collector and the edge of the electrode. Additionally, since $\rho_e^{ccp}$ and $\rho_e^{ccn}$, in various circumstances, are nearly zero, $R_e^{pos/cc}$ and $R_e^{neg/cc}$ can be approximated as:

$$R_e^{pos/cc} = \rho_e^{pos} \times \frac{l/2}{a} \quad (9)$$

$$R_e^{neg/cc} = \rho_e^{neg} \times \frac{l/2}{a} \quad (10)$$

The equivalent circuit may further include three separate types of ion resistances including the resistance between the positive electrodes and the negative electrodes as well as the resistance between positive and negative electrodes and the separator. Ion resistances between the same electrodes are defined by:

$$R_{ion}^{pos} = \rho_{ion}^{pos} \times \frac{l}{a} \quad (11)$$

$$R_{ion}^{neg} = \rho_{ion}^{neg} \times \frac{l}{a} \quad (12)$$

Where $\rho_{ion}^{pos}$ and $\rho_{ion}^{neg}$ are the ionic resistivities of the positive and negative electrodes, respectively. The resistance at the interface between the positive and negative electrodes is defined by:

$$R_{ion}^{sep} = \rho_{ion}^{pos} \times \frac{(l-s)/2}{a} + \rho_{ion}^{neg} \times \frac{(l-s)/2}{a} + \rho_{ion}^{sep} \times \frac{s}{a} \quad (13)$$

Where s is the thickness of the separator and $\rho_{ion}^{sep}$ is the ionic resistivity of the separator. In general, $\rho_{ion}^{pos}$, $\rho_{ion}^{neg}$, and $\rho_{ion}^{sep}$ are different from the ionic resistivity of the bulk electrolyte since it changes with the structural properties of the electrodes and separator. The charge transfer is defined by:

$$R_{ct}^{pos} = \rho_{ct}^{pos/sol} \times \frac{1}{a_{reac}} \quad (14)$$

$$R_{ct}^{neg} = \rho_{ct}^{neg/sol} \times \frac{1}{a_{reac}} \quad (15)$$

Where $\rho_{ct}^{pos/pos}$ and $\rho_{ct}^{neg/sol}$ are the contact resistivities of the interface between the electrolyte and the positive and negative electrodes, and where $a_{reac}$ is the reaction surface area. The reaction surface area is computed by:

$$a_{reac} = cv_{electrode} \quad (16)$$

Where $v_{electrode}$ is the volume of the electrode in one element, and corresponds to the volume of the element. c is the conversion factor. As a general note, at the interface between two electrodes, the volume of the electrode is not consistent with the volume of the element due to the existence of the separator and, thus, is given by:

$$v_{electrode} = v_{element} - v_{separator} \quad (17)$$

Where $v_{element}$ and $v_{separator}$ are the volume of the element and the separator, respectively. Substituting EQ. 16 into EQS. 14 and 15 provides:

$$R_{ct}^{pos} = \rho_{ct}^{pos/sol} \times \frac{1}{cv_{electrode}} = \frac{\sigma_{ct}^{pos/sol}}{v_{electrode}} \quad (18)$$

$$R_{dl}^{neg} = \rho_{dl}^{neg/sol} \times \frac{1}{cv_{electrode}} = \frac{\sigma_{ct}^{neg/sol}}{v_{electrode}} \quad (19)$$

Where the unit of the $\sigma_{ct} = \rho_{ct}/c$ is $\Omega cm^3$. The electric double-layer capacitance between the electrolyte and the electrode is defined by:

$$C_{dl}^{pos}[F] = \epsilon_{dl}^{\frac{pos}{sol}} \left[\frac{F}{cm}\right] \times \frac{a_{reac}[cm^2]}{d_{dl}[cm]} \quad (20)$$

$$C_{dl}^{neg}[F] = \epsilon_{dl}^{\frac{neg}{sol}} \left[\frac{F}{cm}\right] \times \frac{a_{reac}[cm^2]}{d_{dl}[cm]} \quad (21)$$

Where $$\epsilon_{dl}^{\frac{pos}{sol}} \text{ and } \epsilon_{dl}^{\frac{neg}{sol}}$$

are the permittivities of the electric double layer. By substituting Eq. 16 into Eqs. 20 and 21:

$$C_{dl}^{pos}[F] = \epsilon_{dl}^{\frac{pos}{sol}} \times \frac{cv_{electrode}}{d_{dl}} = \zeta_{dl}^{pos/sol} v_{electrode} \quad (22)$$

$$C_{dl}^{neg}[F] = \epsilon_{dl}^{\frac{neg}{sol}} \times \frac{cv_{electrode}}{d_{dl}} = \zeta_{dl}^{neg/sol} v_{electrode} \quad (23)$$

To compute the internal resistance, the analysis module 140 may use the parameters related to the geometry of the design, such as l, a, s, and $v_{electrode}$ which the analysis module 140 may derive from the battery specifications 160 and the resolution of the design. The analysis module 140 may obtain further parameters from, for example, AC impedance analysis of a symmetric cell representation of the design. To compute $R_e$ and $R_{ion}$, the analysis module 140 generally uses at least the electron and ionic resistivities ($\rho_e$, $\rho_{ion}$). To compute $R_{ct}$ and $C_{dl}$, the analysis module 140, in one approach, uses $\sigma_{ct}$ and $\zeta_{dl}$, as defined in the following section.

Because the symmetric cell has two interfaces between the electrode and the separator, the relationship between the experimentally observed charge-transfer resistance ($R_{ct}^{exp}$) and $\sigma_{ct}$ is obtained by:

$$R_{ct}^{exptl.} = \frac{\sigma_{ct}}{WD(H-s)/2} + \frac{\sigma_{ct}}{WD(H-s)/2} = \frac{4\sigma_{ct}}{WD(H-s)} \quad (24)$$

$$\sigma_{ct} = \frac{WD(H-s)}{4} R_{ct}^{exptl.} \quad (25)$$

Where $\sigma_{ct}$ is the charge transfer resistivity. $\zeta_{dl}$ is determined according to the relationship between the top of the capacitative semi-circle ($f_{max}$) and the product of $R_{ct}$ and $C_{dl}$.

$$R_{ct} C_{dl} = \frac{1}{2\pi f_{max}} \quad (26)$$

Substituting Eqs. (18) and (22) or (19) and (23) into Eq. (26) we obtain:

$$\zeta_{dl} = \frac{1}{2\pi f_{max} \sigma_{ct}} \quad (27)$$

Thus, the analysis module 140, in one embodiment, implements Eq. (25) and Eq. (27) in relation to the equivalent circuit that the modeling model 130 generates to derive one or more of the attributes. In this way, the battery modeling system 100 produces the equivalent circuits using multiple degrees of freedom from the designs and analyzes the designs in order to critically assess attributes of the designs. This novel reconstruction of the equivalent circuit provides a basis for analyzing reactions inside the porous electrode and determining various parameters in order to identify and select improved designs for the subsequent manufacture of the battery.

In any case, the battery modeling system 100, in at least one approach, optimizes the battery by generating (e.g., 210 of FIG. 2) a multiplicity of designs according to the random sampling approach previously outlined and subsequently analyzing the designs using the unique multi-dimensional porous electrode model (e.g., 220/230 of FIG. 2) to evaluate the designs across multiple degrees of freedom and consider complex geometries that function to improve power output and capacity, which are associated with lower internal resistances and smaller interface areas, respectively.

For example, in one embodiment, the analysis module 140 determines the various attributes (e.g., 240 of FIG. 2) such as the internal resistance using the equivalent circuit and/or the volume of the design using the battery specifications 160. The analysis module 140 can then assess the attributes in a comparative manner from the various designs in order to identify (e.g., 250 of FIG. 2) a target design that satisfies defined threshold conditions for desired performance of the battery.

In one example, the analysis module 140 defines a circuit threshold to include one or more components that may define optimal surface areas, volumes, resistances, or other attributes. Thus, as one example, the analysis module 140 defines internal resistance as a single attribute that is to be optimized. In further examples, the analysis module 140 may define multiple attributes and can apply a weighted heuristic that assesses the separate attributes together as, for example, a single score. In any case, the analysis module 140 may function to identify a lowest resistance from a group of designs, may iteratively generate and analyze designs until identifying a design having an internal threshold that satisfies the threshold (e.g., is less than/exceeds a lower limit). In this way, the battery modeling system 100 optimizes the output power delivered by the battery in relation to the electrode designs, thereby improving the battery. Subsequently, the battery modeling system 100 can, for example, provide the target design to a manufacturing system (e.g., inkjet printer, 3D printer, etc.) to cause the manufacturing system to manufacture the battery according to the target design, thereby actually producing the battery in an improved form. In further aspects, the battery modeling system 100 may electronically communicate the target design or otherwise provide the target design as an alert or communication specifying the improved design responsive to the original inputs (e.g., the battery specifications 160).

Figure 5:
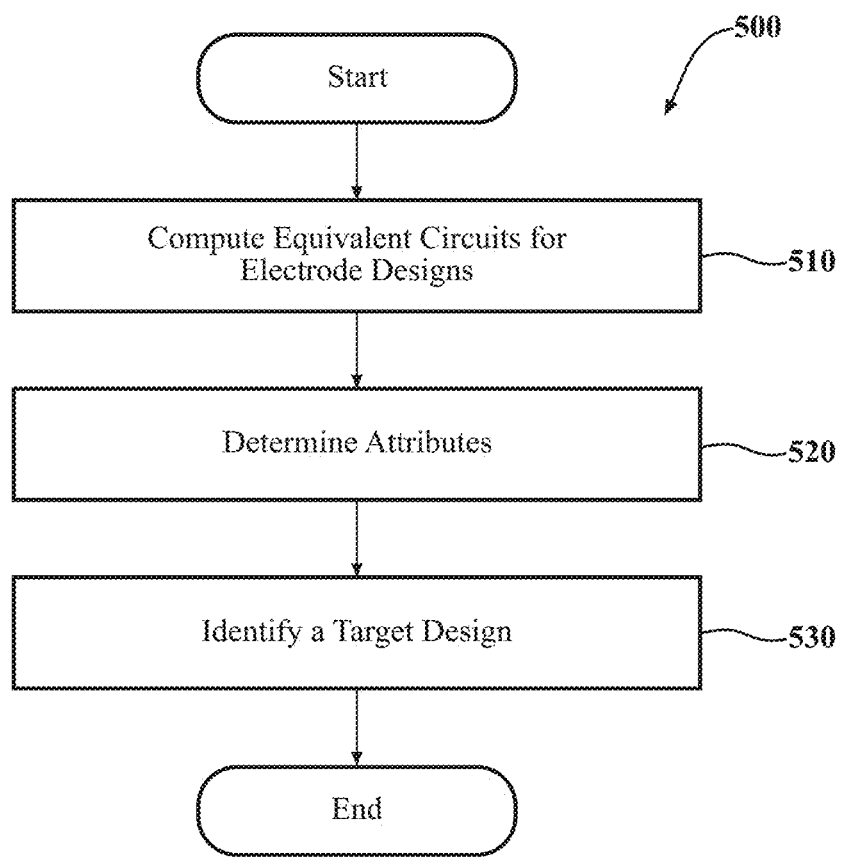
FIG. 5 illustrates one embodiment of a method associated with improving electrode designs.

Additional aspects of identifying an improved electrode design for a battery will be discussed in relation to FIG. 5. FIG. 5 illustrates a flowchart of a method 500 that is associated with determining an improved electrode design of a battery. Method 500 will be discussed from the perspective of the battery modeling system 100 of FIG. 1. While method 500 is discussed in combination with the battery modeling system 100, it should be understood that the method 500 is not limited to being implemented within the battery modeling system 100 but is instead one example of a system that may implement the method 500.

As a point about the initial configuration of the present approach, in one embodiment, the battery modeling system 100, prior to undertaking the method 500, executes various functions to acquire the electrode designs. As previously described, the battery modeling system 100 may acquire the electrode designs by directly generating the designs or by receiving the designs as generated by another system. The electrode designs generally include a geometric configuration of the positive and negative electrodes, and a separator (e.g., 430 of FIG. 4A). In further aspects, additional attributes of the design may be defined along with a design such as an associated battery specification, or further aspects associated with generating the designs. In any case, the battery modeling system 100 initially acquires the designs as a pretense to initiating method 500 at block 510.

At 510, the battery modeling system 100 computes equivalent circuits for the electrode designs. In one embodiment, the modeling module 130 computes the equivalent circuits as porous electrode transmission line models corresponding to the electrode designs and having multiple degrees of freedom. That is, instead of being constrained to a single 1D analysis to derive the equivalent circuits, the modeling module 130 considers multiple dimensions/degrees of freedom to thereby represent the design as a 3D model.

Thus, the modeling module 130, in one approach, generates the equivalent circuits by initially dividing the designs according to a resolution that defines a number of electrode elements for the individual ones of the equivalent circuits. Thus, instead of considering the design in 1D, the modeling module 130 divides the design according to at least two degrees of freedom. As a result, the design is segmented into the electrode elements corresponding with a number of circuit nodes and a number of circuit elements in the individual circuits that are to represent electrochemical behaviors occurring therein. The circuit elements of the equivalent circuits can include electron resistances, ionic resistances, charge-transfer resistances, electric double-layer capacitances, combined internal resistance, and so on.

In any case, the modeling module 130 uses the various elements according to a configuration of the electrodes, separator, and collector plates to connect the various segments together into series circuits or 1D transmission line models that model electrochemical behavior for cylindrical pores of the electrodes. The modeling module 130 then connects the series circuits into the 3D porous model using impedances between the various interfaces. In other words, the modeling module 130 connects the circuits via interfacial impedances to provide the individual ones of the equivalent circuits as multidimensional representations of the electrode designs. This model then functions to relate various aspects of the design form which the design can be assessed.

At 520, the battery modeling system 100 determines attributes for the equivalent circuits according to the at least the two geometric degrees of freedom in which the equivalent circuits are defined. In one embodiment, the analysis module 140 calculates values of the electron resistances and the ionic resistances according to a volume of the electrode elements and the separator thickness, and further calculates values of the charge-transfer resistances and the electric double-layer capacitances according to the battery volume, the separator thickness, and impedance measurements of a symmetric cell representation of the battery. These various aspects of the equivalent circuits can then serve as a basis for further determinations, such as an internal resistance.

For example, the analysis module 140 may extract equivalent/internal resistances by removing electric double-layer capacitances of the equivalent circuits. After removing the double-layer capacitances, the analysis module 140 may collapse the equivalent circuits to the equivalent resistances by combining series elements of the equivalent circuits and parallel elements of the equivalent circuits until the equivalent resistances remain. In this way, the analysis module 140 can generate common points of comparison between otherwise quite distinct electrode designs.

At 530, the analysis module 140 identifies a target design of the electrode designs associated with one of or more of the attributes satisfying a circuit threshold, wherein the target design improves one or more of the attributes in relation to the battery when implementing the battery according to the target design.

In one embodiment, the analysis module 140 identifies the target design by initially defining the circuit threshold as a set of optimization thresholds. The optimization thresholds may include a volume threshold, a resistance threshold, an impedance threshold, and/or other aspects that can serve as a common point of comparison between the designs. The volume threshold is, in one aspect, comprised of a separator volume that is dynamically defined across the electrode designs as a minimum value of the separator volume for the designs. Thus, the module 140 may generate the values for all of the designs and then sort or otherwise search for the minimum value to identify the target design. Similarly, the module 140 can define the circuit threshold defines an internal resistance of the equivalent circuits as a relative minimum resistance among the electrode designs.

Accordingly, the analysis module 140 may identify the target design by selecting the target design as one of the electrode designs that optimizes the output power delivered by the battery in relation to the electrode designs. In general, such an optimization is defined according to identifying the design that has the optimal attributes (e.g., lowest resistance and/or lowest separator volume among the set of designs). In this way, the system 100 can identify the target design that causes a package size of the battery to decrease while maintaining an equivalent amount of output power relative to the other ones of the electrode designs or identifying the target design with different optimal properties to generally improve power provided by the battery.

FIG. 1 will now be discussed in further detail as an example environment within which the system and methods disclosed herein may operate. The battery modeling system 100 can include one or more processors. In one or more arrangements, the processor(s) can be a main processor of the battery modeling system 100. For instance, the processor(s) can be an electronic control unit (ECU). The battery modeling system 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data or other electronic data that is processed by a processor of the battery modeling system 100 at the direction of one or more modules implementing disclosed methods of the present disclosure. In this context, "electronic data" broadly refers to information produced by the battery modeling system 100 and that is received, for example, from various electronic sensors, electronic communications, electronic interactions with control systems and/or devices, and so on.

The battery modeling system 100 can include one or more modules. The modules can be implemented as computer-readable program code that, when executed by a processor, implement one or more of the various processes/methods described herein. One or more of the modules can be a component of the processor(s), or one or more of the modules can be executed on and/or distributed among other processing systems to which the processor(s) is operably connected. Moreover, in further examples, in one or more of the modules are embodied as ASICS, FPGAs, task-specific microprocessors, control units (e.g., ECU), and so on. The modules can include instructions (e.g., program logic) executable by one or more processor(s) and/or the module itself. Alternatively, or in addition, one or more data stores may include instructions that embody the modules.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across multiple interconnected processing systems. As a general matter, an electronic processing system or another apparatus adapted for carrying out the methods described herein may implement the disclosed approach(es). One combination of hardware and software may include a processing system with computer-usable program code that, when being loaded and executed, controls the processing system such that the processing system carries out the methods described herein. The systems, components and/or processes also can be embedded in a computer-readable storage mediums, such as a computer program product or other electronic storage device(s) that are capable of accommodating such computer program code. Furthermore, the computer-readable storage mediums are readable by a machine, tangibly embodying a program of instructions executable by the machine to perform methods and processes described herein.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A battery modeling system for determining an improved electrode design of a battery, comprising:
  one or more processors;
  a memory communicably coupled to the one or more processors and storing:
  a modeling module including instructions that when executed by the one or more processors cause the one or more processors to compute one or more equivalent circuits as porous electrode transmission line models corresponding to one or more electrode designs, wherein individual circuits of the equivalent circuits define an arrangement of electrode elements having at least two geometric degrees of freedom, and wherein the electrode designs are defined according to battery specifications indicating at least a battery volume, and a separator thickness; and
  an analysis module including instructions that when executed by the one or more processors cause the one or more processors to:
  i) determine attributes for the equivalent circuits according to the at least the two geometric degrees of freedom in which the equivalent circuits are defined by calculating values of electron resistances and ionic resistances according to a volume of the electrode elements and the separator thickness, and calculating values of charge-transfer resistances and electric double-layer capacitances according to the battery volume, the separator thickness, and impedance measurements of a symmetric cell representation of the battery,
  wherein circuit elements of the equivalent circuits include element attributes comprising the electron resistances, the ionic resistances, the charge-transfer resistances, and the electric double-layer capacitances, and ii) identify a target design of the electrode designs associated with one of or more of the attributes satisfying a circuit threshold, wherein the target design improves one or more of the attributes in relation to the battery when implementing the battery according to the target design, manufacture the battery by providing the target design to one or more manufacturing systems.

2. The battery modeling system of claim 1, wherein the modeling module includes instructions to compute the equivalent circuits including instructions to generate the equivalent circuits according to a resolution that defines a number of electrode elements for the individual circuits of the equivalent circuits, the electrode elements corresponding with a number of circuit nodes and a number of circuit elements in the individual circuits, and wherein the electrode elements are three-dimensional (3D) elements.

3. The battery modeling system of claim 2, wherein the modeling module includes instructions to compute the equivalent circuits for the electrode designs including instructions to connect, for individual designs of the electrode designs, one-dimensional (1D) transmission line models together via the circuit elements for the electron resistances and the ionic resistances according to the geometric degrees of freedom, and wherein the 1D transmission line models describe an electrochemical behavior for cylindrical pores of electrodes within individual designs of the electrode designs.

4. The battery modeling system of claim 3, wherein the modeling module includes instructions to generate the equivalent circuits by connecting separate ones of the 1D transmission line models via interfacial impedances to provide the individual circuits of the equivalent circuits as multidimensional representations of the electrode designs comprised of at least two of the 1D transmission line models.

5. The battery modeling system of claim 1, wherein the analysis module includes instructions to determine the attributes of the equivalent circuits including instructions to extract equivalent resistances by:

removing electric double-layer capacitances of the equivalent circuits, and collapsing the equivalent circuits to the equivalent resistances by combining series elements of the equivalent circuits and parallel elements of the equivalent circuits until the equivalent resistances remain.

6. The battery modeling system of claim 1, wherein the modeling module further includes instructions to generate the one or more electrode designs by:

arranging positive electrode elements of the electrode elements such that the positive electrode elements do not touch a negative current collector, and arranging negative electrode elements of the electrode elements such that the negative electrode elements do not touch a positive current collector.

7. The battery modeling system of claim 6, wherein the modeling module includes instructions to generate the one or more electrode designs by:

arranging positive electrode elements of the electrode elements such that at least one side of the positive electrode elements touches another one of the positive electrode elements, and arranging negative electrode elements of the electrode elements such that at least one side of the negative electrode elements touches another one of the negative electrode elements, wherein the battery is a lithium-ion micro-battery.

8. The battery modeling system of claim 1, wherein the circuit threshold defines an internal resistance of the equivalent circuits as a relative minimum resistance among the electrode designs, wherein the analysis module includes instructions to identify the target design including instructions to select the target design as one of the electrode designs that optimizes output power delivered by the battery in relation to the electrode designs, and wherein the target design causes a package size of the battery to decrease while maintaining an equivalent amount of output power relative to other ones of the electrode designs.

9. A non-transitory computer-readable medium for determining an improved electrode design of a battery and including instructions that when executed by one or more processors cause the one or more processors to:

compute an equivalent circuit as a porous electrode transmission line model corresponding to an electrode design, wherein the equivalent circuit defines an arrangement of electrode elements having at least two geometric degrees of freedom, and wherein the electrode design is defined according to a battery specification indicating at least a battery volume, and a separator thickness;

determine attributes for the equivalent circuit according to the at least the two geometric degrees of freedom in which the equivalent circuits are defined, by calculating values of electron resistances and ionic resistances according to a volume of the electrode elements and the separator thickness, and calculating values of charge-transfer resistances and electric double-layer capacitances according to the battery volume, the separator thickness, and impedance measurements of a symmetric cell representation of the battery, wherein circuit elements of the equivalent circuits include element attributes comprising the electron resistances, the ionic resistances, the charge-transfer resistances, and the electric double-layer capacitances;

provide the attributes as an electronic output about the electrode design; and manufacture the battery by providing the electrode design to one or more manufacturing systems.

10. A method for determining an improved electrode design of a battery, comprising:

computing one or more equivalent circuits as porous electrode transmission line models corresponding to one or more electrode designs, wherein individual circuits of the equivalent circuits define an arrangement of electrode elements having at least two geometric degrees of freedom, and wherein the electrode designs are defined according to battery specifications indicating at least a battery volume, and a separator thickness;

determining attributes for the equivalent circuits according to the at least the two geometric degrees of freedom in which the equivalent circuits are defined, by calculating values of electron resistances and ionic resistances according to a volume of the electrode elements and the separator thickness, and calculating values of charge-transfer resistances and electric double-layer capacitances according to the battery volume, the separator thickness, and impedance measurements of a symmetric cell representation of the battery, wherein circuit elements of the equivalent circuits include element attributes comprising the electron resistances, the ionic resistances, the charge-transfer resistances, and the electric double-layer capacitances; and identifying a target design of the electrode designs associated with one of or more of the attributes satisfying a circuit threshold, wherein the target design improves one or more of the attributes in relation to the battery when implementing the battery according to the target design, manufacturing the battery by providing the target design to one or more manufacturing systems.

11. The method of claim 10, wherein computing the equivalent circuits includes generating the equivalent circuits according to a resolution that defines a number of electrode elements for the individual circuits of the equivalent circuits, the electrode elements corresponding with a number of circuit nodes and a number of circuit elements in the individual circuits, wherein the circuit elements of the equivalent circuits include element attributes comprising electron resistances, ionic resistances, charge-transfer resistances, and electric double-layer capacitances, and wherein the electrode elements are three-dimensional (3D) elements.

12. The method of claim 11, wherein computing the equivalent circuits for the electrode designs includes connecting, for individual designs of the electrode designs, one-dimensional (1D) transmission line models together via the circuit elements for the electron resistances and the ionic resistances according to the geometric degrees of freedom, and wherein the 1D transmission line models describe an electrochemical behavior for cylindrical pores of electrodes within the individual designs of the electrode designs.

13. The method of claim 12, wherein generating the equivalent circuits includes connecting separate ones of the 1D transmission line models by interfacial impedances to provide the individual circuits of the equivalent circuits as multidimensional representations of the electrode designs comprised of at least two of the 1D transmission line models.

14. The method of claim 10, wherein determining the attributes of the equivalent circuits includes extracting equivalent resistances by:

removing electric double-layer capacitances of the equivalent circuits, and collapsing the equivalent circuits to the equivalent resistances by combining series elements of the equivalent circuits and parallel elements of the equivalent circuits until the equivalent resistances remain.

15. The method of claim 10, further comprising:
generating the one or more electrode designs by:
arranging positive electrode elements of the electrode elements such that the positive electrode elements do not touch a negative current collector, and
arranging negative electrode elements of the electrode elements such that the negative electrode elements do not touch a positive current collector.

16. The method of claim 10, wherein generating the one or more electrode designs includes:
arranging positive electrode elements of the electrode elements such that at least one side of the positive electrode elements touches another one of the positive electrode elements, and
arranging negative electrode elements of the electrode elements such that at least one side of the negative electrode elements touches another one of the negative electrode elements.

17. The method of claim 10, wherein identifying the target design includes:
defining the circuit threshold as a set of optimization thresholds including a volume threshold, wherein the volume threshold is a separator volume that is dynamically defined across the electrode designs as a minimum value of the separator volume,
wherein the target design improves an energy density of the battery when implementing the battery according to the target design.

18. The method of claim 10, wherein the circuit threshold defines an internal resistance of the equivalent circuits as a relative minimum resistance among the electrode designs,
wherein identifying the target design includes selecting the target design as one of the electrode designs that optimizes output power delivered by the battery in relation to the electrode designs, and
wherein the target design causes a package size of the battery to decrease while maintaining an equivalent amount of output power relative to the other ones of the electrode designs.

* * * * *